Dec. 21, 1943.  C. W. HEWLETT  2,337,329
TREATMENT OF SURFACES
Filed Dec. 18, 1941  2 Sheets—Sheet 1

Inventor:
Clarence W. Hewlett,
by Harry E. Dunham
His Attorney.

Dec. 21, 1943.  C. W. HEWLETT  2,337,329
TREATMENT OF SURFACES
Filed Dec. 18, 1941   2 Sheets-Sheet 2
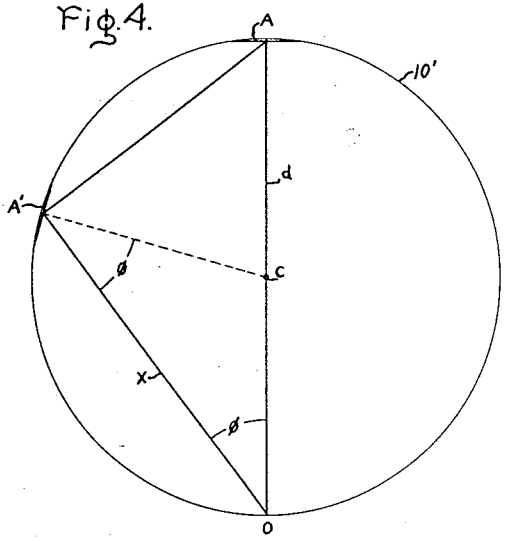
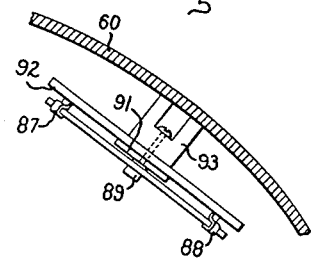
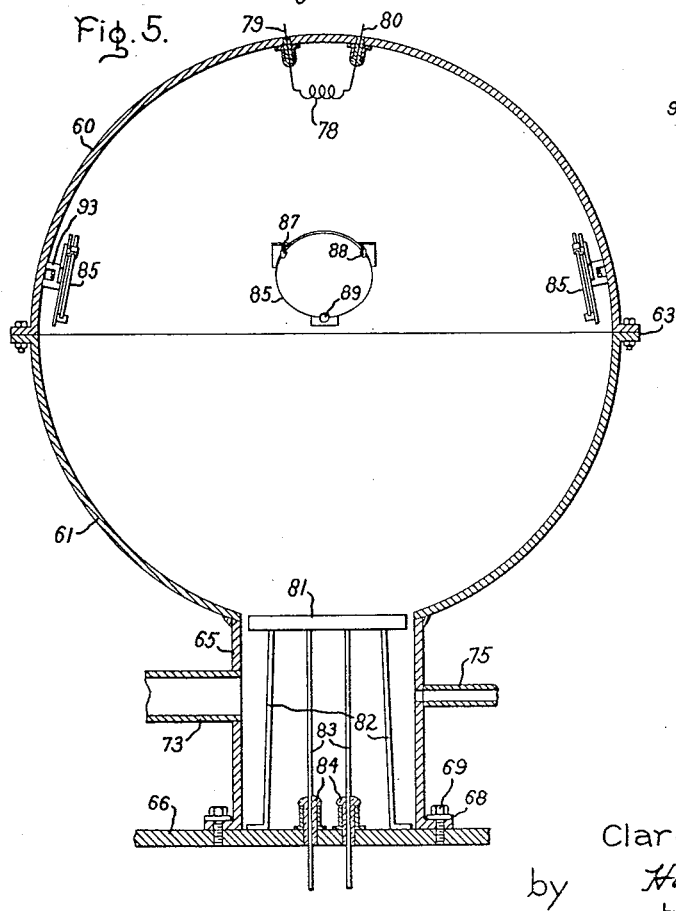
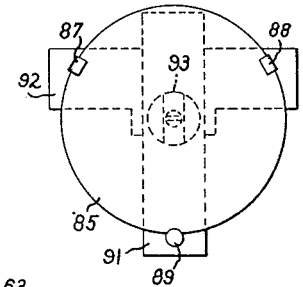
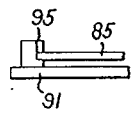
Inventor:
Clarence W. Hewlett,
by Harry E. Dunham
His Attorney.

Patented Dec. 21, 1943

2,337,329

UNITED STATES PATENT OFFICE 2,337,329

TREATMENT OF SURFACES

Clarence W. Hewlett, Schenectady, N. Y., assignor to General Electric Company, a corporation of New York Application December 18, 1941, Serial No. 423,561

7 Claims. (Cl. 117—106)

The present invention relates to an improved method and means for treating surfaces and is especially applicable to the deposition of substances desired to be applied by vaporization.

There are numerous articles of manufacture the fabrication of which involves the step of subjecting each article to a coating or treating substance in vapor form under vacuum conditions. One example of an article of this kind is a rectifier of the blocking layer type in which selenium and other metals are required to be deposited on a base member. In the example referred to the metal to be deposited is conveniently supplied by evaporation. As heretofore practiced, the vaporizing procedure has had to be carried out with extreme care and in some cases has required the concurrent use of a large number of separate vapor sources in order to assure uniform deposition of metal upon the surfaces being treated. These considerations have complicated the manufacturing procedure and made it difficult to produce rectifier cells on an economical basis.

It is a primary object of the present invention to provide a simplified procedure and apparatus for permitting a large number of rectifier electrode base members or blanks (or other articles required to be treated in an analogous manner) to be coated simultaneously with vaporized metal under conditions calculated to assure uniform quality of the resultant product.

The apparatus which is employed in the attainment of the foregoing object comprises, in a typical embodiment, a holder by which the various articles to be treated may be supported in a spherical or quasi-spherical locus which also contains a source of the treating substance. An analysis of the geometrical considerations upon which the utility of this arrangement depends will be provided at a later point.

A further important aspect of the invention consists in the provision of a spherical holder having conveniently usable means for supporting a large number of articles within the interior of the holder.

Figure 1:
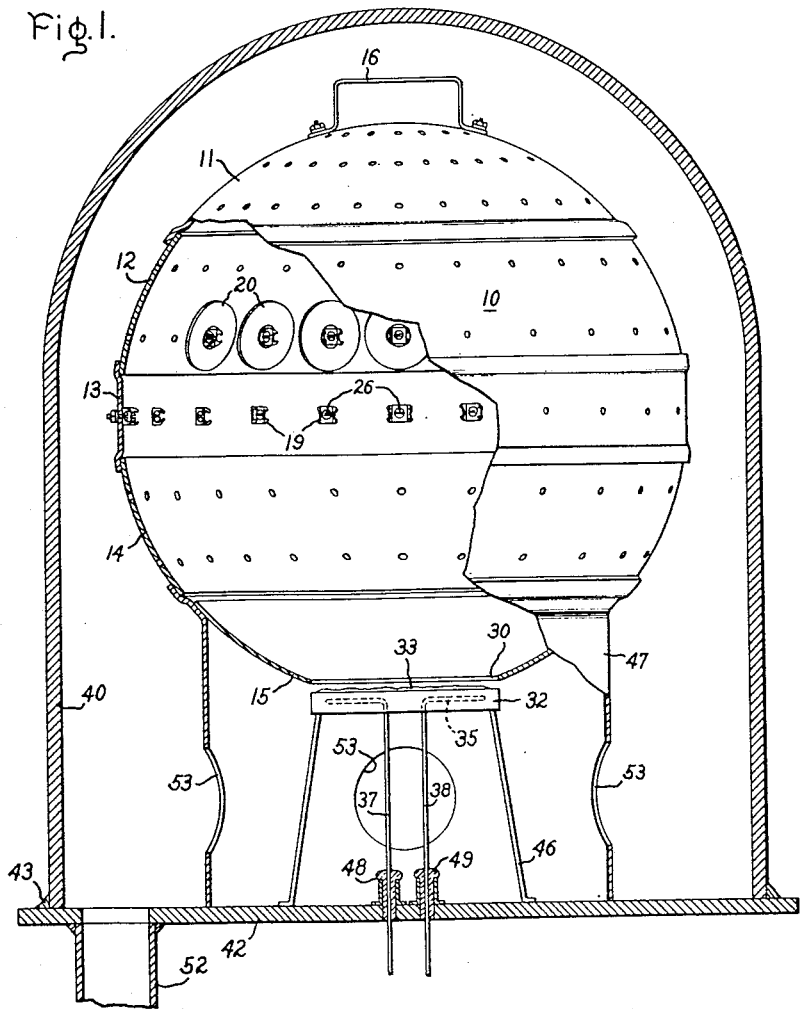
Figure 2:
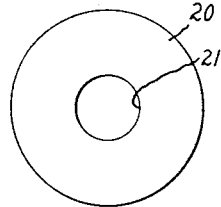
Figure 3:
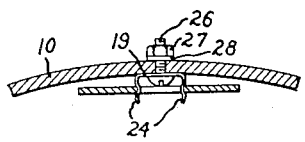

The invention may best be understood by reference to the following description taken in connection with the accompanying drawings in which Fig. 1 represents in partial section an apparatus suitably embodying the invention; Fig. 2 is an enlarged view of a blank to be coated of a type adapted to be treated in the apparatus of Fig. 1; Fig. 3 is an enlarged view of a portion of the structure of Fig. 1 sectionalized to show an arrangement by which such blank may be secured to a holder; Fig. 4 is a diagrammatic representation useful in explaining the invention; Fig. 5 is a sectional view of an alternative embodiment of the invention, and Figs. 6, 7 and 8 illustrate various aspects of a mounting arrangement to be used in connection with the construction of Fig. 5.

Referring particularly to Fig. 1, there is shown an apparatus which includes as a principal element a large spherical holder, designated as a whole by the numeral 10. This includes a number of separable segments 11 to 15 inclusive which may be taken apart to give access to the interior of the enclosure and for a further purpose to be specified at a later point. The top sector 11 is provided with a handle 16 by which it may be lifted by the operator. Each of the sectors with the exception of sector 15 is provided internally with a number of mounting brackets 19 to which individual rectifier cells 20 may be attached. For simplification of the drawing, the brackets have been illustrated only in connection with sectors 12 and 13. The nature of the rectifier blanks is shown in Fig. 2, which represents a single blank comprising a flat disk or washer 20 heaving a central opening 21.

As is most clearly shown in Fig. 3, each of the brackets 19 comprises a spring clip having a pair of resilient prongs 24 which are directed inwardly with respect to the inner surface of the holder 10. Each clip is affixed to the holder by means of a screw 26 which extends through the holder wall and which is engaged at its outer end by a nut 27 and a lock washer 28. The rectifier units are secured to the various clips by forcing the prongs 24 through the circular openings 21 so that the units are retained by the spring action of the prongs. A sufficient number of mounting brackets are provided so that substantially the entire interior surface of the holder may be covered with rectifier blank.

The bottom holder part 15 is provided at its lower portion with an opening 30, preferably of circular form. This opening is of such size as to accommodate a plate or pan 32 on the upper surface of which is placed a supply of a metal 33 (e. g. selenium) desired to be deposited on the various rectifier blanks by vaporization. The plate 32, which conforms fairly closely to the dimensions of the opening 30, has within its structure a resistance heating element 35 which may consist, for example, of a coil or grid of refractory metal wire. Terminal connections 37 and 38 are provided by which sufficient current can be supplied to the heater 35 to raise the plate 32 to a temperature at which vaporization of the metal 33 takes place.

It is desired that the vaporizing process take place under vacuum conditions and to this end there is placed around the holder 10 a vacuum-tight enclosure including a bell jar 40 of glass or metal and a floor plate 42 which is hermetically joined to the bell jar by means of a temporary seal indicated at 43. Vacuum-tight lead-in connections for the conductors 37 and 38 are provided by means of glass-to-metal seals indicated at 48 and 49. Mounting standards 46 extending from the floor plate 42 to the evaporator 32 serve to support the latter element, and a metal cylinder 47 performs a similar function in connection with the holder 10. Evacuation of the structure is accomplished through a duct 52 which extends downwardly from the floor-plate 42 and which connects with a vacuum pump (not shown). In order that gas contained within the holder 10 may be readily drawn out by the evacuating apparatus, the supporting cylinder 47 is provided with a number of large openings 53.

With the arrangement described it is found that vaporization of metal from the surface of the plate 32 results in the deposition of a uniform coating of metal upon all the various blanks 20 supported by the holder 10. The reasons for this result may best be understood by reference to the diagrammatic representation of Fig. 4.

In the figure last referred to, A is assumed to be an article of such small dimensions as to represent only an elemental area of the spherical surface 10' of which it forms a part. A' represents an exactly similar article displaced from the first by an angle $\phi$, measured from a point O at which a vapor source is located. Slight consideration will show that the amount of vaporized metal generated at the point O which will be deposited upon either of the articles A, A' will be inversely proportional to the square of the distance of the selected article from the point O and will be directly proportional to the area of the article as projected on a plane which lies perpendicular to a ray extending to the article from the point O. It may be further deduced from theoretical considerations and has been verified experimentally that the density of the projected vapor will be maximum for an article (such as A) which lies on the normal to the surface of which the point O forms a part and will be progressively less according to a cosine variation for articles angularly displaced from the normal. We may, therefore, write:

$$D = \frac{K}{x^2}(\cos \phi) a \qquad (1)$$

where D is the amount of vaporized metal deposited upon a particular article (e. g. the article A'), K is a constant determined by the conditions of the experiment, $x$ is the distance of the particular article from the vapor source, $\phi$ is the angular displacement of the article from the normal to the vapor source, and $a$ is the projected area of A' on a plane perpendicular to $x$.

As a first step in further resolving Equation 1 it is helpful to draw the rays OA', A'A and OA (Fig. 4), the last-named ray being obviously the same as the diameter $d$ of the sphere 10'. Since the triangle OA'A lies in a semi-circle, it is obviously a right triangle, and the ray OA', which is identical with the distance $x$, is clearly equal to $$d \cos \phi$$

Accordingly, we may at once rewrite Equation 1 as follows:

$$D = \frac{Ka}{d^2 \cos \phi} \qquad (2)$$

Furthermore, it is readily shown that the angle CA'O which A' makes with the perpendicular to $x$ is equal to $\phi$; hence the projected area $a$ is A' $\cos \phi$ and Equation 2 becomes $$D = \frac{KA'}{d^2} \qquad (3)$$

A' here being taken to represent the area of the article in question. Since this relation is wholly independent of the angle $\phi$, it becomes clear that the amount of vapor deposited on any article which has an area equal to that of the article A' (e. g. as A) and which is located in the locus 10' is constant regardless of the precise location of the article with respect to the source O.

In utilizing the invention in connection with the fabrication of blocking layer rectifiers, a number of rectifier base plates (e. g. of aluminum or aluminum alloy) are mounted in the spherical holder 10 in the manner illustrated in Fig. 1. Thereafter, a weighed charge of bismuth is placed in the evaporating pan 32 and this and the loaded holder are mounted in the bell jar. The jar is then evacuated and the bismuth charge is evaporated to provide on the rectifier blanks a surface coating adapted to make good contact with a layer of selenium to be deposited subsequently.

Following this operation, a second evaporating pan is filled with a weighed charge of selenium and this and the spherical holder carrying the bismuth-coated elements are mounted in a second vacuum enclosure which is then evacuated to permit evaporation of the charge of selenium. As a preliminary to this last step, it is found advantageous in most cases to heat the holder and the contained rectifier blanks to a temperature of about 100° C., for example, by placing the entire assembly in an oven and transferring to a vacuum apparatus after the desired temperature has been attained. After evaporation of the selenium, the resulting coating may be subjected to further heat treatment, for example, by placing the holder in an oven at 150° C., this treatment having the effect of hardening and conditioning the layer of selenium. Thereafter, one or more additional coatings of selenium may be applied by a repetition of the technique described above, it being useful in some cases to reverse the positions of the holder sectors 12 and 14 between successive coating operations in order to provide assurance that the coatings on the base members supported by these sectors shall be uniform not only in density but also in their other properties, such as orientation of the deposited metal particles. After the desired amount of selenium is deposited, the coated base members are subjected to final heat treatment to crystallize the selenium, thereby rendering it conductive and building up a thin blocking layer on the selenium surface. The blocking layer may be further developed by treating the surface of the selenium layer with hydrogen-peroxide according to a preferred method, or alternatively by evaporating selenium dioxide upon it. Finally, counterelectrodes are laid down upon the blocking layer, and the rectifier elements are "formed" and tested by appropriate electrical means.

It is advantageous in some cases to make the article holder of such construction that it is adapted to serve concurrently as a vacuum-tight enclosure within which the vaporizing process may be carried out. A structure which is suitable for this use is shown in Fig. 5. In this modification the holder is constituted of two hemispherical parts 60 and 61 which are joined in vacuum-tight relation by means of a clamped joint indicated at 63. The lower holder section connects with a supporting cylinder 65 which is secured to a floor plate 66. In order that the joint between the cylinder 65 and the floor plate may be both demountable and vacuum-tight, it is made by means of a clamping ring 68 and a series of bolts 69. A duct 73 extending from the wall of the cylinder 65 serves for evacuating the holder when this is desired, and a further duct 75 provides a connection to a vacuum gauge (not shown). In order to assist in heating the parts enclosed within the holder in cases where temperature control is necessary, there is provided a resistance heater in the form of a coiled filament 78 having lead-in conductors 79 and 80 sealed through the upper part of the enclosure.

For the purpose of coating articles contained within the enclosure with an evaporated substance, use is made of an evaporator 81 which lies in the produced surface of the hemisphere 61. This is supported by means of standards 82 and is supplied with heating current through conductors 83. A pair of lead-in seals 84 provide vacuum-tight terminal connections for these conductors.

By making the enclosure parts 60, 61 of ferromagnetic material (e. g. of steel) it is possible to support articles within the enclosure by means of small magnets placed in contact with its inner surface. This is illustrated in Fig. 5 by three similar elements designated by the numeral 85, each of these elements being assumed to be an article which is to be coated with material vaporized from the evaporator 81.

As appears more clearly in Figs. 6, 7 and 8, each of the articles 85 is held in place by means of appropriately formed studs 87, 88 and 89 by which it is attached to a pair of crossed metal strips 91 and 92. These strips in turn are secured to a U-shaped permanent magnet 93 which is capable of adhering to the inner surface of the steel hemisphere 60. The studs 87 and 88 are in the form of spring clips attached to the metal strip 92, while the cooperating stud 89 is a relatively rigid member which is attached to the strip 91 and which has a notch 95 (Fig. 8). The mounting brackets thus formed are of course readily detachable from the enclosure wall and may be separately loaded outside the enclosure, being thereafter attached in any desired arrangement to the various areas of the enclosure interior.

The invention described in the foregoing has numerous applications other than in the fabrication of selenium rectifiers. For example, a holder of the construction illustrated in Fig. 5 has been successfully used in the process of treating glass windows for metering instruments to reduce reflection from the window surfaces. In this connection, the window elements are mounted in the enclosure (e. g. by means of the supporting arrangements shown in Figs. 6, 7 and 8) and the enclosure is thereafter sealed and evacuated. After the evacuation is complete, a quantity of magnesium fluoride is evaporated from the surface of the evaporator 81 to produce on the exposed glass parts a reflection-reducing film of the type described in Cartwright and Turner Patent 2,207,656, granted July 9, 1940. Still other applications of analogous character will occur to those skilled in the art.

It is not necessary that the article holder be of perfectly spherical form, and the benefits of the invention may be substantially realized even though a considerable departure from this form is permitted. For example, in one case in which it was inexpedient to produce complete evacuation of the space within which the evaporating process was carried out, the uniformity of deposition of the evaporated metal was found to be increased by using a holder of flattened or elliptical form, the flattening being in a direction calculated to decrease the distance from the evaporator to the part of the holder which is on the normal to the evaporator surface. The superior performance of a non-spherical holder in this instance is apparently attributable to the effect of the residual gas on the propagation of the vapor from the source at which it is generated.

I aim in the appended claims to cover all such variations of structure of application as come within the true spirit and scope of the foregoing disclosure.

What I claim as new and desire to secure by Letters Patent of the United States is:

1. The method of causing a number of bodies to be uniformly and simultaneously subjected to a substance in vapor form, which method comprises supporting the bodies so that the surfaces desired to be affected constitute inwardly directed components of a common spherical locus, providing a quantity of the said substance at a point which also lies at least in the said locus, evacuating the space surrounding said bodies and said substance and thereupon vaporizing said substance.

2. Apparatus for depositing on a number of bodies simultaneously uniform coatings of a substance comprising means for supporting the bodies in a generally spherical locus, a holder for the desired substance located in the same locus means for evacuating the space surrounding said bodies and substance to be vaporized and means for vaporizing said substance.

3. Apparatus for permitting a number of bodies to be uniformly and simultaneously subjected to a substance in vaporous form comprising an evacuated container, means therein for supporting the bodies in a generally spherical locus, means for supporting a quantity of the said substance also in the said locus, and means for vaporizing the substance.

4. Apparatus for uniformly coating a plurality of bodies with selenium comprising a container means for supporting bodies to be coated therein so that the surfaces to be coated form inwardly directed components of a generally spherical locus, means for supporting a quantity of selenium also in the said locus, a gas-tight housing surrounding said container, means for evacuating said housing and container, and means for vaporizing the selenium.

5. Apparatus for permitting a plurality of similar objects to be uniformly and simultaneously subjected to a substance in vaporous form comprising a hollow holder having a plurality of inwardly directed brackets for mounting the said objects, the object receiving parts of said brackets lying substantially in a common spherical locus, means for supporting a quantity of the said substance at an opening in said holder and also in the said locus, means for evacuating said holder and means for vaporizing the substance.

6. Apparatus for simultaneously coating a plurality of bodies with a substance desired to be deposited in vapor state comprising a vacuum-tight enclosure of generally spherical configuration, means for attaching the said bodies to the inner wall surface of the enclosure at spaced locations, means for establishing vacuum conditions within the interior of the enclosure, and means for projecting vapor of the said substance into the enclosure from a point substantially coincident with a spherical locus passing through the surface of said bodies intended to be coated.

7. Apparatus for simultaneously coating a plurality of similar articles with a substance desired to be deposited in vapor state comprising a generally spherical enclosure of ferromagnetic metal, a plurality of mounting frames for respectively receiving the various articles, each of said frames including a magnet for attaching the frame to the interior wall surface of the enclosure in such positions that the surfaces of said articles are substantially coincident with the surface of a sphere close to the inner wall of said enclosure, a gas-tight housing surrounding said enclosure, means for evacuating said enclosure and housing, and means for projecting vapor of the said substance into the enclosure from a point substantially coincident with said spherical surface.

CLARENCE W. HEWLETT.